(12) United States Patent
Sudo

(10) Patent No.: US 6,442,668 B2
(45) Date of Patent: *Aug. 27, 2002

(54) BUS CONTROL SYSTEM

(75) Inventor: Hirofumi Sudo, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,676

(22) Filed: Nov. 23, 1998

(30) Foreign Application Priority Data

Nov. 28, 1997 (JP) .............................. 9-344039

(51) Int. Cl.$^7$ .............................. G06F 12/02
(52) U.S. Cl. .................. 711/211; 711/154; 714/45; 712/228
(58) Field of Search ................ 711/211, 170, 711/154, 3, 133, 165; 710/126; 714/45, 724; 712/228; 365/51

(56) References Cited

U.S. PATENT DOCUMENTS

| | | | | |
|---|---|---|---|---|
| 4,463,419 A | * | 7/1984 | Takane ................ 711/165 |
| 5,021,993 A | * | 6/1991 | Matoba et al. ............ 712/228 |
| 5,652,847 A | * | 7/1997 | Padwekar ................ 710/126 |
| 5,737,764 A | * | 4/1998 | Shigeeda ................ 711/170 |
| 5,809,514 A | * | 9/1998 | Nasserbakht et al. .......... 711/3 |
| 5,856,937 A | * | 1/1999 | Chu et al. .................. 365/51 |
| 5,903,912 A | * | 5/1999 | Hansen ................ 711/154 |
| 5,974,508 A | * | 10/1999 | Naheshwari ................ 711/133 |
| 6,055,651 A | * | 4/2000 | Sasaki et al. .................. 714/45 |

FOREIGN PATENT DOCUMENTS

| | | |
|---|---|---|
| EP | 0 718 763 A1 | 6/1996 |
| GB | 2 293 467 A | 3/1996 |
| JP | 4-148244 | 5/1992 |
| JP | 5-120160 | 5/1993 |
| JP | 5-135188 | 6/1993 |
| JP | 6-214819 | 8/1994 |
| JP | 6-348534 | 12/1994 |
| WO | WO 98/07091 | 2/1998 |

OTHER PUBLICATIONS

Giorgi et al., © 1997, IEEE, "Trace Factory", pp. 54–68.*

* cited by examiner

*Primary Examiner*—Matthew Kim
*Assistant Examiner*—B. R. Peugh
(74) *Attorney, Agent, or Firm*—Whitham, Curtis & Christofferson, P.C.

(57) ABSTRACT

A micro processor board of the bus control system comprises an internal bus which address lines, data lines, and control signal lines. The micro processor board also includes a memory connected via the internal bus with the micro processor, registers such as a system control register, and a bus interface circuit. Access to the main memory, the register, or the bus interface which is executed by the micro processor is outputted from an external bus via the bus interface circuit. Thus, the operational status of the micro processor or the internal bus can be traced by tracing the external bus.

4 Claims, 2 Drawing Sheets

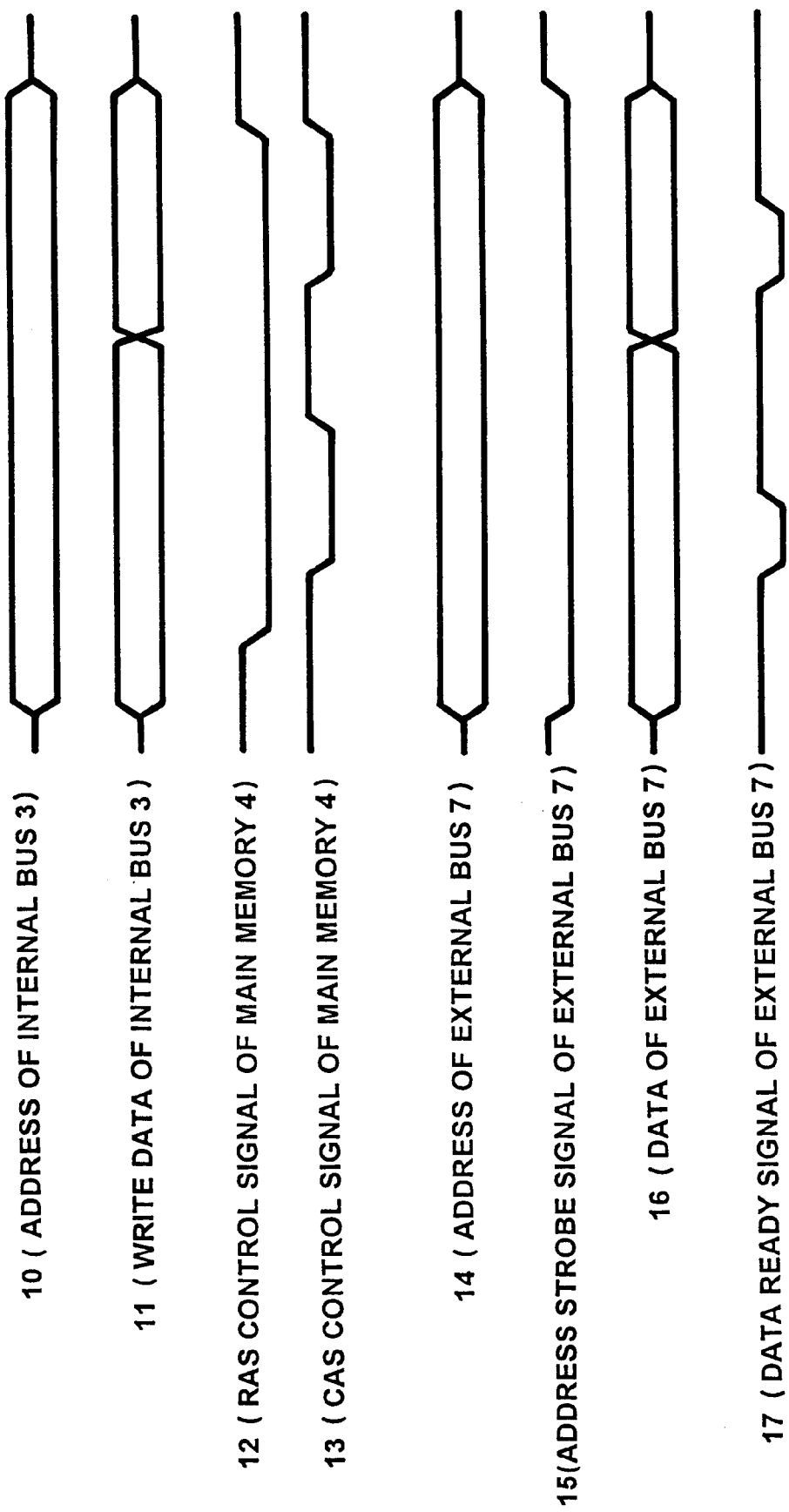

BUS CONTROL SYSTEM

BACKGROUND OF THE INVENTION

1. Field of the Invention

The present invention relates to a bus control system, and more particularly, to a bus control system applicable for bus trace for monitoring the operational status of a micro processor.

2. Description of the Prior Art

There is disclosed a multi-chip module evaluating device in, for example, Japanese Patent Laid-Open No. 5-120160 (1993), which traces wiring signals between a floating operation unit and a data memory. The wiring signals which are closed in the module, substrate of a multi-chip module are traced by connecting, via a prober, a leader pad on the module substrate with a monitor unit, which comprises a memory, an address generator, and a comparator. This evaluating device can directly trace a wiring signal, without using any test element group (TEG). Therefore, this evaluating device is employed for tracing wiring signals, because an evaluation merely by signals extracted to external pins is not sufficient, especially in the case of mounting LSI packages on the module substrate.

The above-mentioned conventional device has the following disadvantages:

Firstly, leader pads are necessary for tracing the wiring signal, because the wiring signal is closed in the module substrate. Accordingly, the above-mentioned evaluating device is not of any use for a multi-chip module which is small-size-oriented, because the number of pads increases with an increase in the number of wirings which completes in the module substrate, which in turn results in an increase in the pads area.

Secondly, a testing device is exclusively necessary for bus trace. Specially designed probers are required for connecting themselves with the special leader pads on the module substrate.

Thirdly, the reliability of bus trace is lowered. When the leader pads are inferior due to a manufacturing process, then the module substrate can not be traced completely.

SUMMARY OF THE INVENTION

An object of the present invention is to provide a bus control system with improved reliability for easily tracing signals on the bus of a micro processor via a bus interface, when evaluating bus interface peripheral circuits and software for a micro processor board. Another object of the present invention is to improve the reliability of the evaluation system.

According to the present invention, there is provided a bus control system, which comprises a micro processor, a main memory and a system control register each of which is accessed via an internal bus by the micro processor, and a bus interface.

The bus control system of the present invention further includes a tracing means for tracing every access, by the micro processor, to the main memory, to the system control register, and to the bus interface by using an external bus via the bus interface.

According to the present invention as explained above, the following effects are obtained:

Firstly, the leader pads become unnecessary for tracing the wiring signal which is closed in a module substrate, because every status of an internal bus can be traced via the bus interface.

Secondly, a high density mounting board such as a multi-chip module can be furthermore integrated in a higher density, keeping the compatibility of function of the internal bus tracing, because the exclusive pads become unnecessary and the wide mounting area is preserved.

Thirdly, bus trace becomes easy, because ordinarily available instruments can be used for bus trace at the external bus connected with bus interface, or the peripheral circuit of a micro processor board.

BRIEF EXPLANATION OF THE DRAWINGS

FIG. 2 is a timing chart for explaining the action of the bus control system of the present invention.

PREFERRED EMBODIMENT OF THE INVENTION

Figure 1:
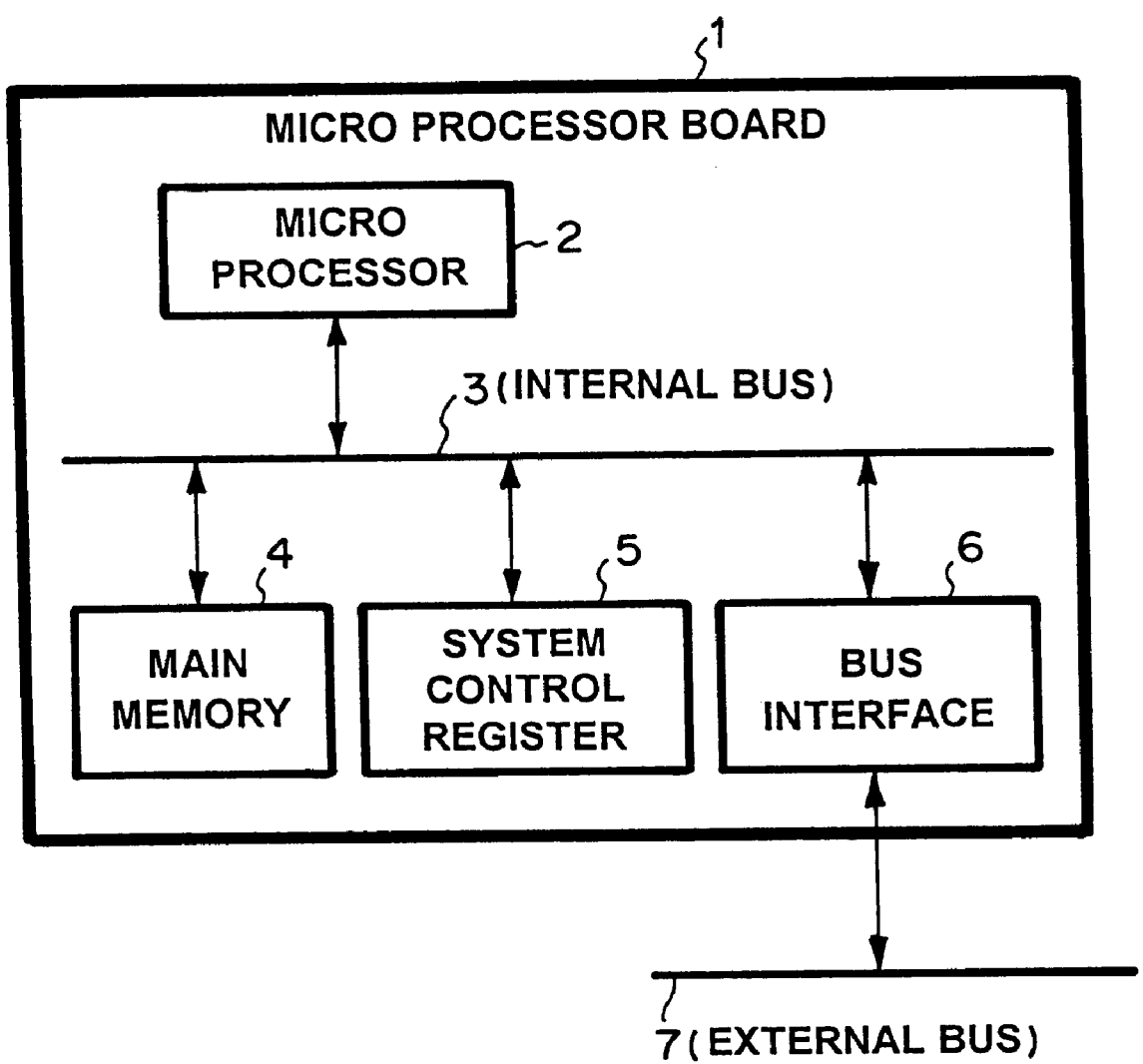
FIG. 1 is a block diagram of a bus control system of the present invention.

A preferred embodiment of the present invention is explained. The micro processor board of the bus control system of the present invention includes an internal bus comprising, address lines, data lines, and control signal lines. The micro processor board also includes a micro processor, a memory connected via the internal bus with the micro processor, registers such as a system control register, and a bus interface circuit. Every access to the main memory, the register, and the bus interface by the micro processor is outputted to an external bus via the bus interface circuit. Accordingly, the operation status of the micro processor or the internal bus can be traced by tracing the external bus.

Concretely, the micro processor indicates a write timing and read timing by using bus interface signals, when write data and read data of the micro processor are outputted from the bus interface circuit to the external bus. Thus, the data flow is traced by the external bus.

Referring to the accompanying drawings, a working example of the present invention is explained to clarify the embodiment of the present invention.

As shown in FIG. 1, micro processor board 1 comprises micro processor 2 connected with internal bus 3, main memory 4, system control register 5, and bus interface 6. Further, micro processor board 1 is connected with external bus 7 via bus interface 6.

Next, referring to FIG. 1, the action of micro processor board 1 of the working example is explained.

Micro processor 2 accesses to main memory 4 and system control register 5 via internal bus 3. Therefore, every access in micro processor board 1 can be traced by monitoring internal bus 3.

Bus interface 6 outputs addresses, data, and control signals in internal bus 3 toward external bus 7, when micro processor 2 executes a write access to main memory 4, or system control register 5.

Also, bus interface 6 outputs addresses, data, and control signals in internal bus 3 toward external bus 7, when micro processor 2 executes a read access to main memory 4, or system control register 5.

Thus, internal bus 3 can be traced by tracing external bus 7. In other words, the execution process of a program of micro processor 2 mounted on micro processor board 1 can be traced by tracing external bus 7.

Referring to FIG. 2, the action of bus interface 6 between internal bus 3 and external bus 7 of the working example is explained.

The action of two word write into main memory by micro processor 2 as shown in FIG. 1 is shown concretely in FIG. 2.

Internal bus 3 executes a write access to main memory 4, carrying internal bus address 10 and internal bus write data 11 in micro processor 2.

Main memory 4 accepts internal bus address 10 and internal bus write data 11 and writes them by using row address strobe (RAS) control signal 12 and column address strobe (CAS) control signal 13, while bus interface 6 outputs the same address as an internal bus address toward external bus address 14. At the same time bus interface 6 outputs external bus strobe 15 to validate the external bus address.

Bus interface 6 outputs external bus data 16 which are the same as internal bus data 11. At the same time bus interface 6 outputs external bus data ready 17 synchronized with CAS control signal 13.

Thus, an effective timing of a write address and write data are confirmed by external bus 7, when micro processor 2 executes a write access to main memory 3.

Similarly, an effective timing of a read address and read data are confirmed by external bus 7, when micro processor 2 executes a read access to main memory 4. The access to system control register 5 are confirmed similarly. Thus, internal bus 3 can be traced by external bus 7.

The micro processor and bus interface of the present invention may be active circuits. Circuits other than the micro processor and the bus interface may be passive circuits. And, addresses and data of the active circuits may be traced from the external bus via the bus interface in accordance with the present invention.

The bus control system may also include an auxiliary memory and an auxiliary register, both of which may be connected to the micro processor via the internal bus.

What is claimed is:

1. A bus control system, comprising:
   a micro processor,
   an internal bus,
   a main memory,
   a system control register,
   a bus interface,
   an external bus, and
   a tracing means for tracing operation states of said micro processor, wherein:
      said main memory and said system control register are accessed via said internal bus by said micro processor, said bus interface outputting write and read data to said external bus indicative of accesses made by said micro processor to said main memory and said system control register;
      said tracing means trace accesses of said main memory and said system control register by said micro processor by monitoring said external bus; and
      said micro processor, said internal bus, said main memory, said system control register, and said bus interface are mounted on a single substrate.

2. The bus control system according to claim 1, wherein addresses, write data, and read data are outputted from said bus interface, and write timings and read timings are outputted using prescribed signals which run in said bus interface.

3. The bus control system to claim 1, wherein addresses and data in said internal bus are fed into said external bus.

4. The bus control system according to claim 1, wherein:
   said micro processor and said bus interface are active circuits;
   circuits except said micro processor and said bus interface are passive circuits; and
   addresses and data of said active circuits are traced from said external bus via said bus interface by said tracing means.

* * * * *